DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED AUGUST 3, 1976

949 O.G. 8

T949,003

ELECTRICAL ISOLATION CIRCUIT FOR CONNECTING CUSTOMER EQUIPMENT TO THE TELEPHONE NETWORK

Harold Westly Earle, New Shrewsbury, and Joseph Robbins, Marlboro, N.J., assignors to Bell Telephone Laboratories Incorporated, Murray Hill, N.J.

Filed May 14, 1975, Ser. No. 577,288
Int. Cl.[2] H04Q 3/58
U.S. Cl. 179—16 EA
1 Sheet Drawing. 8 Pages Specification

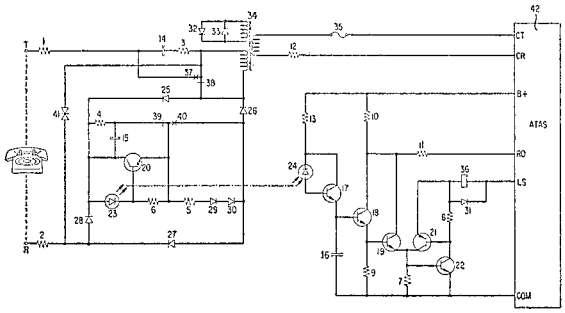

Protection of the telecommunications network and personnel from harm is afforded by a simplified guard circuit designed principally to interconnect automatic telephone answering devices with the network. The circuit features a two-way audio talking path and a separate incoming-only signaling path. Line seizure occurs in response to detection of ringing current, indicated to the customer device as a voltage reduction on a monitoring lead, and by the concurrent arming of a semiconductor switch in series with the customer power source and the guard circuit's line seizure relay. Line release is by the customer deenergizing the relay, either when the automatic answer cycle is completed or when there is an indication that the calling party has disconnected. Additional circuitry is included to prevent introducing hazardous voltage to the network from the customer's interface, to assure longitudinal line balance, to guard against excess signal level and to prevent origination of unauthorized network control signals such as line seizure and dialing. Other functions include proper on-hook and off-hook line termination, to prevent transmission in on-hook condition, preventing coupling longitudinal or metallic noise sources to the telephone line in the on-hook condition, and responding to ringing signals while rejecting dialing transients.

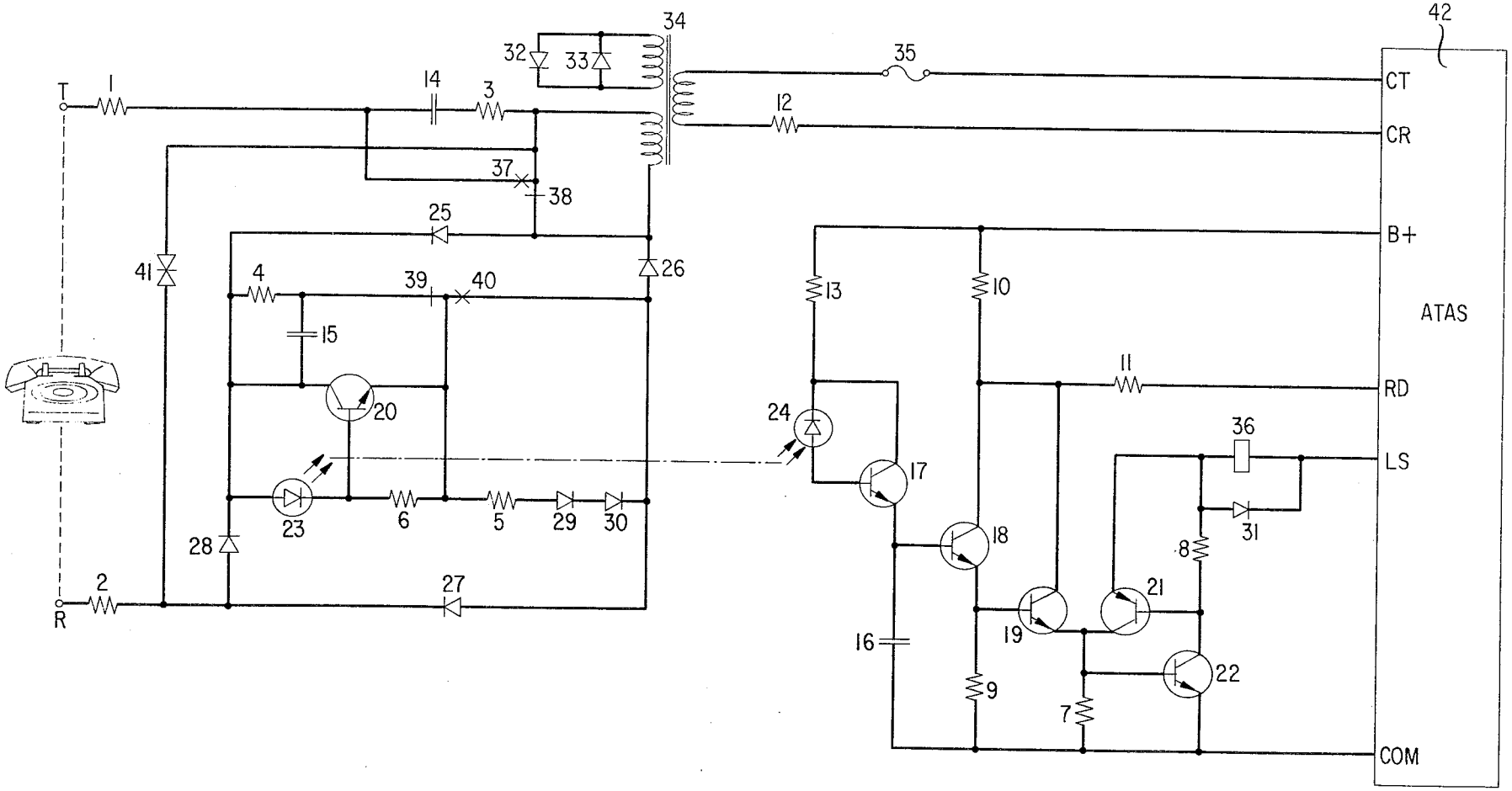

ELECTRICAL ISOLATION CIRCUIT FOR CONNECTING CUSTOMER EQUIPMENT TO THE TELEPHONE NETWORK
Original Filed May 14, 1975